United States Patent
Zhang et al.

(10) Patent No.: US 12,323,051 B2
(45) Date of Patent: Jun. 3, 2025

(54) POWER SUPPLY APPARATUS AND METHOD FOR CONTROLLING POWER SUPPLY APPARATUS

(71) Applicant: Delta Electronics (Shanghai) Co., Ltd., Shanghai (CN)

(72) Inventors: Xiaojing Zhang, Shanghai (CN); Kai Liu, Shanghai (CN); Baohua Wang, Shanghai (CN)

(73) Assignee: Delta Electronics (Shanghai) Co., Ltd., Shanghai (CN)

(*) Notice: Subject to any disclaimer, the term of this patent is extended or adjusted under 35 U.S.C. 154(b) by 263 days.

(21) Appl. No.: 18/193,657

(22) Filed: Mar. 31, 2023

(65) Prior Publication Data
US 2023/0344333 A1    Oct. 26, 2023

(30) Foreign Application Priority Data
Apr. 25, 2022    (CN) .......................... 202210436468.X (51) Int. Cl.
H02M 1/32    (2007.01)
H02M 3/02    (2006.01)
H02M 7/04    (2006.01)

(52) U.S. Cl.
CPC .............. H02M 1/32 (2013.01); H02M 3/02 (2013.01); H02M 7/04 (2013.01)

(58) Field of Classification Search
CPC ............ H02M 1/32; H02M 3/02; H02M 7/04
See application file for complete search history.

(56) References Cited

U.S. PATENT DOCUMENTS

| | | | | |
|---|---|---|---|---|
| 5,023,541 A | * | 6/1991 | Yosinski | G05F 1/563 323/280 |
| 2016/0234894 A1 | * | 8/2016 | Wang | H02M 3/04 |
| 2022/0103076 A1 | * | 3/2022 | Cheng | H02M 3/33523 |
| 2022/0368220 A1 | * | 11/2022 | Chang | H02M 3/158 |

FOREIGN PATENT DOCUMENTS

| CN | 103777670 B | 9/2015 |
|---|---|---|
| CN | 110212761 A | 9/2019 |

* cited by examiner

*Primary Examiner* — Jue Zhang
*Assistant Examiner* — Lakaisha Jackson
(74) *Attorney, Agent, or Firm* — CKC & Partners Co., LLC (57) ABSTRACT

A power supply apparatus and a method for controlling the same are provided in the present disclosure, and the power supply apparatus includes: a mode selection module, configured to provide for a user to select an output mode; a reference value setting module, configured to output an output voltage reference value and an output current reference value; a current control loop and a voltage control loop, which receive reference values respectively, and output a first and a second electric signal respectively; a loop selection module, configured to transmit the first or the second electric signal to a drive module; and the drive module, configured to provide a drive signal to a main power module to control the main power module to output a constant voltage/current, and perform voltage-limiting/current-limiting protection when the output voltage or the output current is greater than or equal to a threshold voltage/current for over-voltage/over-current protection.

17 Claims, 4 Drawing Sheets

POWER SUPPLY APPARATUS AND METHOD FOR CONTROLLING POWER SUPPLY APPARATUS

CROSS-REFERENCE TO RELATED APPLICATIONS

This application claims priority to Chinese Patent Application No. 202210436468.X, filed on Apr. 25, 2022, the content of which is hereby incorporated by reference in its entirety.

TECHNICAL FIELD

The present disclosure relates to the field of power electronic converters, and in particular, to a power supply apparatus and a method for controlling the power supply apparatus.

BACKGROUND

A switching power supply is a high-frequency electric energy conversion apparatus and is a type of power supply, of which the function is to convert a voltage into another voltage required by an end user through different forms of architectures.

The switching power supply can be classified into a constant-voltage power supply and a constant-current power supply according to output characteristics. An output voltage of the constant-voltage power supply is kept constant, and an output current of the constant-voltage power supply is determined by load. An output current of the constant-current power supply is kept constant, and an output voltage of the constant-current power supply is determined by load. The constant-current power supply is commonly used for an LED load or a battery load. Currently, most switching power supplies can either work in constant voltage output mode or work in constant current output mode normally, and therefore, a range of loads that can be applied is greatly limited. For an existing switching power supply, it is generally used only as the constant-voltage power supply or the constant-current power supply. However, in order to ensure normal operation of the switching power supply, a constant-current point is generally set as an over-power protection point for the constant-voltage power supply, and a constant-voltage point is set as an over-voltage protection point for the constant-current power supply. For another existing switching power supply, although the switching power supply may be selected to be used as the constant-voltage power supply or the constant-current power supply, over-power protection cannot be provided when it operates in one of the modes.

Based on the described problem, it is desired to propose a power supply apparatus and a method for controlling the power supply apparatus to change an operation mode of the switching power supply according to a load condition, and at the same time, provide over-power protection for the switching power supply.

SUMMARY

The present disclosure provides a power supply apparatus and a method for controlling the power supply apparatus, so as to solve a problem that an existing power supply apparatus cannot provide over-power protection for a switching power supply while changing an operation mode of the switching power supply according to a load condition.

According to a first aspect, the present disclosure provides a power supply apparatus for providing an output voltage and an output current, including a main power module, a mode selection module, a reference value setting module, a voltage control loop, a current control loop, a loop selection module and a drive module, where the mode selection module is configured to provide for a user to select an output mode, where the output mode includes a constant-current output mode and a constant-voltage output mode;

a first input terminal of the reference value setting module is connected to the mode selection module, where the reference value setting module is configured to output an output voltage reference value and an output current reference value according to the output mode selected by the user; where when the output mode selected by the user is the constant-current output mode, the output voltage reference value is a threshold voltage for over-voltage protection of the power supply apparatus; and when the output mode selected by the user is the constant-voltage output mode, the output current reference value is a threshold current for over-current protection of the power supply apparatus;

the current control loop receives a signal reflecting the output current and the output current reference value, and outputs a first electric signal;

the voltage control loop receives a signal reflecting the output voltage and the output voltage reference value, and outputs a second electric signal;

two input terminals of the loop selection module respectively receive the first electric signal and the second electric signal, an output terminal of the loop selection module is connected to an input terminal of the drive module, and the loop selection module is configured to select to transmit the first electric signal or the second electric signal to the input terminal of the drive module; and an output terminal of the drive module provides a drive signal for the main power module to control the main power module to output a constant voltage or a constant current.

In an embodiment, the loop selection module, the current control loop and the voltage control loop are implemented by analogy circuit or digital control.

In an embodiment, the current control loop and the voltage control loop are implemented by analogy circuit, the loop selection module includes a first diode and a second diode, a cathode of the first diode is connected to an output terminal of the current control loop, a cathode of the second diode is connected to an output terminal of the voltage control loop, and both an anode of the first diode and an anode of the second diode are connected to the input terminal of the drive module.

In an embodiment, under a condition that the output mode selected by the user is the constant-voltage output mode, when the output current is greater than or equal to the threshold current for over-current protection, the loop selection module transmits the first electric signal to the input terminal of the drive module; and when the output current is less than the threshold current for over-current protection, the loop selection module transmits the second electric signal to the input terminal of the drive module; and under a condition that the output mode selected by the user is the constant-current output mode, when the output voltage is greater than or equal to the threshold voltage for over-voltage protection, the loop selection module transmits the second electric signal to the input terminal of the drive module; and when the output voltage is less than the threshold voltage for over-voltage protection, the loop selection module transmits the first electric signal to the input terminal of the drive module.

In an embodiment, the reference value setting module includes: a micro control unit and a digital-to-analog converter;
  a first input terminal of the micro control unit is connected to an output terminal of the mode selection module, an output terminal of the micro control unit is connected to an input terminal of the digital-to-analogue converter, and the micro control unit is configured to determine the output voltage reference value and the output current reference value according to the output mode selected by the user; and
  a first output terminal of the digital-to-analog converter is configured to output the output current reference value, and a second output terminal of the digital-to-analog converter is configured to output the output voltage reference value.

In an embodiment, the drive module includes a photocoupler and a control unit, where
  an input terminal of the photocoupler is connected to the output terminal of the loop selection module; and
  an input terminal of the control unit is connected to an output terminal of the photocoupler, an output terminal of the control unit is connected to the main power module and outputs a drive control signal to control the main power module to output the constant current in the constant-current output mode and provide voltage-limiting protection when the output voltage is greater than or equal to the threshold voltage for over-voltage protection; and control the main power module to output the constant voltage in the constant-voltage output mode, and provide current-limiting protection when the output current is greater than or equal to the threshold current for over-current protection.

In an embodiment, the power supply apparatus further includes a potentiometer, configured to provide for the user to input a set value; and
  a second input terminal of the reference value setting module is connected to the potentiometer, and the reference value setting module is configured to adjust the output current reference value according to the set value when the user selects the constant-current output mode, and determine the output voltage reference value according to a pre-set output power; and is further configured to adjust the output voltage reference value according to the set value when the user selects the constant-voltage output mode, and determine the output current reference value according to the pre-set output power.

In an embodiment, the power supply apparatus further includes a communication module; and
  a third input terminal of the reference value setting module receives data from the communication module, and the reference value setting module adjusts the output current reference value and the output voltage reference value according to the received data.

In an embodiment, the main power module includes an AC-DC converting unit and a DC-DC converting unit, and the AC-DC converting unit and the DC-DC converting unit are connected in cascade.

According to a second aspect, the present disclosure provides a method for controlling a power supply apparatus, where the power supply apparatus includes a main power module for providing an output voltage and an output current, and the method includes:
  selecting one of a constant-current output mode and a constant-voltage output mode;
  setting an output voltage reference value and an output current reference value according to the selected output mode; where when the selected output mode is the constant-current output mode, the output voltage reference value is a threshold voltage for over-voltage protection of the power supply apparatus; and when the selected output mode is the constant-voltage output mode, the output current reference value is a threshold current for over-current protection of the power supply apparatus;
  obtaining a first electric signal according to the output current reference value and a signal reflecting the output current;
  transmitting the first electric signal to a first input terminal of a loop selection module;
  obtaining a second electric signal according to the output voltage reference value and a signal reflecting the output voltage;
  transmitting the second electric signal to a second input terminal of the loop selection module;
  connecting an output terminal of the loop selection module to a drive module, where the loop selection module is configured to select to transmit the first electric signal to the drive module or transmit the second electric signal to the drive module; and
  generating, by the drive module, a drive signal to control the main power module.

In an embodiment, the loop selection module, the current control loop and the voltage control loop are implemented by analogy circuit or digital control.

In an embodiment, the current control loop and the voltage control loop are implemented by analogy circuit, the loop selection module includes a first diode and a second diode, a cathode of the first diode is connected to an output terminal of the current control loop, a cathode of the second diode is connected to an output terminal of the voltage control loop, and both an anode of the first diode and an anode of the second diode are connected to an input terminal of the drive module.

In an embodiment, under a condition that the selected output mode is the constant-voltage output mode, when the output current is greater than or equal to the threshold current for over-current protection of the power supply apparatus, transmitting, by the loop selection module, the first electric signal to the drive module; and when the output current is less than the threshold current for over-current protection of the power supply apparatus, transmitting, by the loop selection module, the second electric signal to the drive module; and under a condition that the selected output mode is the constant-current output mode, when the output voltage is greater than or equal to the threshold voltage for over-voltage protection of the power supply apparatus, transmitting, by the loop selection module, the second electric signal to the drive module; and when the output voltage is less than the threshold voltage for over-voltage protection of the power supply apparatus, transmitting, by the loop selection module, the first electric signal to the drive module.

In an embodiment, the drive module includes a photocoupler and a control unit, where
  an input terminal of the photocoupler is connected to the output terminal of the loop selection module; and an input terminal of the control unit is connected to an output terminal of the photocoupler, an output terminal of the control unit is connected to the main power module and outputs a drive control signal to control the main power module to output a constant current in the constant-current output mode and provide voltage-limiting protection when the output voltage is greater than or equal to the threshold voltage for over-voltage protection; and control the main power module to output a constant voltage in the constant-voltage output mode, and provide current-limiting protection when the output current is greater than or equal to the threshold current for over-current protection.

In an embodiment, the method further includes:
when the selected output mode is the constant-current output mode, adjusting, by a reference value setting module, the output current reference value according to a set value of a potentiometer by a user, and determining the output voltage reference value according to a pre-set output power; or, when the selected output mode is the constant-voltage output mode, adjusting, by the reference value setting module, the output voltage reference value according to the set value of the potentiometer by the user, and determining the output current reference value according to the pre-set output power.

In an embodiment, the method further includes:
adjusting, by the reference value setting module, the output current reference value and the output voltage reference value according to data received from a communication module.

In an embodiment, the main power module includes an AC-DC converting unit and a DC-DC converting unit, and the AC-DC converting unit and the DC-DC converting unit are connected in cascade.

BRIEF DESCRIPTION OF DRAWINGS

To describe technical solutions of the present disclosure or in the prior art more clearly, the following briefly introduces accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly and completely describes technical solutions in embodiments of the present disclosure with reference to accompanying drawings in the embodiments of the present disclosure. Apparently, the embodiments to be described are merely a part rather than all of the embodiments of the present disclosure. Other embodiments obtained by a person of ordinary skill in the art based on the embodiments of the present disclosure without creative efforts shall belong to the protection scope of the present disclosure.

Terms such as "first", "second", "third", "fourth" and the like (if present) in the description, claims and the accompanying drawings of the present disclosure are used for distinguishing similar objects, and are not necessarily used for describing a specific sequence or sequential order. It should be understood that data used in such a way may be interchanged where appropriate, to enable the embodiments of the disclosure described herein to be implemented, for example, in a sequence other than those illustrated or described herein. In addition, terms "include" and "have", and any variations thereof, are intended to cover a non-exclusive inclusion, for example, a process, a method, a system, a product, or a device that includes a series of steps or units is not necessarily limited to those steps or units that are expressly listed, but may include other steps or units that are not expressly listed or inherent to such process, method, product, or device.

Figure 1:
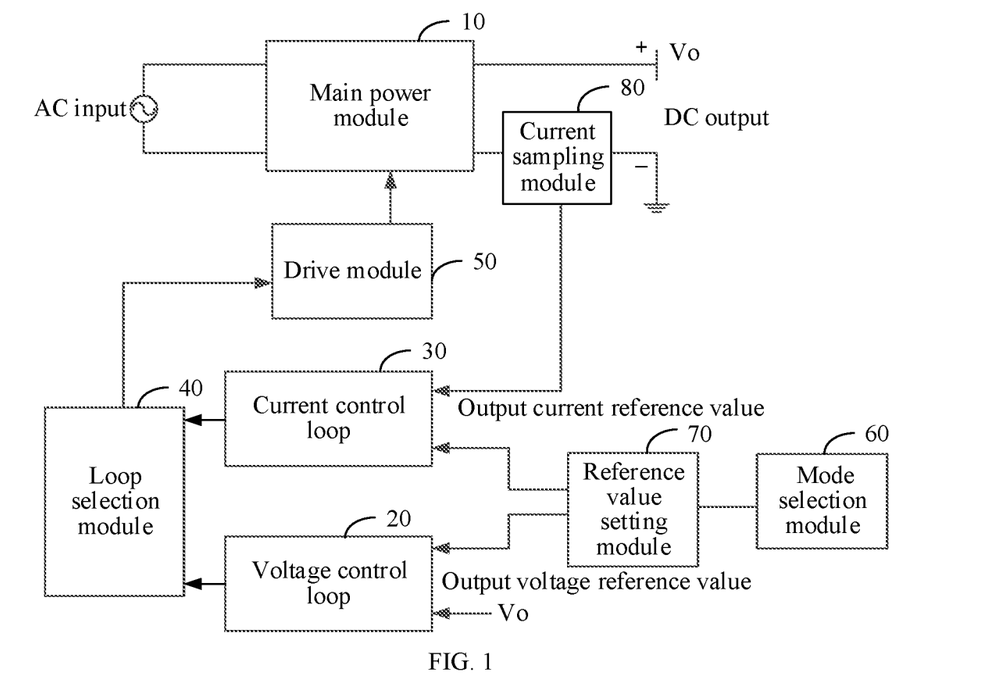
FIG. 1 is a schematic structural diagram of a power supply apparatus provided by an embodiment of the present disclosure.

FIG. 1 is a schematic structural diagram of a power supply apparatus provided by an embodiment of the present disclosure. As shown in FIG. 1, a main power module 10 in the power supply apparatus can provide an output voltage and an output current controlled by a voltage control loop 20 or a current control loop 30. The current control loop 30 is connected to a drive module 50 through a loop selection module 40; and the voltage control loop 20 is connected to the drive module 50 through the loop selection module 40. A mode selection module 60 is provided for a user to select the constant-current output mode or the constant-voltage output mode. A reference value setting module 70 can output an output current reference value and an output voltage reference value. When an output mode selected by the user is the constant-current output mode, the output current reference value is for the current output by the main power module 10, and the output voltage reference value is a threshold voltage for over-voltage protection. When the output mode selected by the user is the constant-voltage output mode, the output voltage reference value is for the voltage output by the main power module 10, and the output current reference value is a threshold current for over-current protection. A current sampling module 80 is configured to provide a signal reflecting the output current of the main power module 10 for the current control loop 30.

An existing power supply apparatus may be classified into two types according to output characteristics: a constant-voltage power supply and a constant-current power supply. For the constant-voltage power supply, the output voltage is maintained substantially constant. The constant-voltage power supply can only be connected to a load whose input voltage is constant, and cannot be connected to a load whose input current is constant (such as an LED load and a battery load). Although part of the constant-voltage power supplies may have an auxiliary control of a constant current, constant-current control only serves as a protection in case of overload or short circuit. Likewise, for the constant-current power supply, the output current is maintained substantially constant. The constant-current power supply can only be connected to a load whose input current is constant, and the output voltage thereof is determined by the load. The constant-current power supply cannot be connected to a load whose input voltage is constant. And although part of the constant-current power supplies may have auxiliary control of a constant-voltage, constant-voltage control only serves as a protection when their output is open or over voltage.

For another existing power supply apparatus, a voltage control loop and a current control loop can be simultaneously provided inside the power supply apparatus, and meanwhile, a selecting module is provided to connect the voltage control loop or the current control loop to the drive module, thus it is implemented that the power supply apparatus has a constant-voltage operation mode and a constant-current operation mode. But such a power supply apparatus cannot perform over-power protection in the constant-voltage operation mode or the constant-current operation mode.

Based on the described problems, a new power supply apparatus and a new method for controlling the new power supply apparatus are provided by the present disclosure. The mode selection module 60 is provided for the user to select the constant-current output mode or the constant-voltage output mode. The reference value setting module 70 is provided for outputting the output voltage reference value and the output current reference value according to the output mode selected by the user. And the loop selection module 40 is provided for controlling an operation of the drive module 50 through the voltage control loop 20 or the current control loop 30 according to actual situations, and thus, the power supply apparatus can operate in the constant-current output mode or the constant-voltage output mode according to a type of the load, thereby increasing a range of the load to which the power supply apparatus can be applicable. Meanwhile, when the power supply apparatus operates in a certain output mode through the voltage control loop 20 or the current control loop 30, another loop is also connected to the drive module. Therefore, when the output voltage or the output current is excessively large, an over-power protection function is further provided, and normal use of a switching power supply can be ensured.

The technical solutions of the present disclosure are described in detail in the following with specific embodiments. The specific embodiments may be combined with each other, and the same or similar concepts or processes may not be repeated in some embodiments.

As shown in FIG. 1, a power supply apparatus is configured to provide an output voltage and an output current, and includes a main power module 10, a mode selection module 60, a reference value setting module 70, a voltage control loop 20, a current control loop 30, a loop selection module 40 and a drive module 50.

The mode selection module 60 is configured to provide for a user to select an output mode, where the output mode includes a constant-current output mode and a constant-voltage output mode.

A first input terminal of the reference value setting module 70 is connected to the mode selection module 60, and the reference value setting module 70 is configured to output an output voltage reference value and an output current reference value according to the output mode selected by the user. When the user selects the constant-current output mode, the output voltage reference value is a threshold voltage for over-voltage protection of the power supply apparatus, and when the user selects the constant-voltage output mode, the output current reference value is a threshold current for over-current protection of the power supply apparatus.

The current control loop 30 receives a signal reflecting the output current and the output current reference value, and outputs a first electric signal. The voltage control loop 20 receives the output voltage reference value and a signal reflecting the output voltage, and outputs a second electric signal.

Two input terminals of the loop selection module 40 respectively receive the first electric signal and the second electric signal, an output terminal of the loop selection module 40 is connected to an input terminal of the drive module 50. The loop selection module 40 is configured to select to transmit the first electric signal or the second electric signal to the input terminal of the drive module 50. An output terminal of the driving module 50 provides a drive signal to the main power module 10, so as to control the main power module 10 to output a constant voltage or a constant current.

The mode selection module 60 is configured to provide for the user to select the output mode of the power supply apparatus, and the output mode may be the constant-current output mode or the constant-voltage output mode. When a load is a load of constant-voltage input type, the user may select the constant-voltage output mode, and when the load is a load of a constant-current input type, the user may select the constant-current output mode. In FIG. 1, Vo denotes the output voltage of the power supply apparatus or the main power module 10.

An output terminal of the mode selection module 60 is connected to the first input terminal of the reference value setting module 70, which is configured to determine the output voltage reference value and the output current reference value according to the output mode selected by the user. When the selected output mode is the constant-voltage output mode, the power supply apparatus operates in the constant-voltage output mode. At this time, the output voltage reference value output by the reference value setting module 70 is a set value of a voltage output by the main power module 10, and the output current reference value output by the reference value setting module 70 is the threshold current for over-current protection of the power supply apparatus. When the current control loop 30 determines that the output current is greater than or equal to the threshold current for over-current protection according to the received signal reflecting the output current, the output current of the main power module 10 is limited.

For example, when the output mode is the constant-voltage output mode, the output voltage reference value is set to 48V. A maximum output power of the power supply may be set to 2500 W in the reference value setting module 70, and the output current reference value may be determined according to the maximum output power, that is, the output current reference value is 52.1 A, which indicates that the power supply apparatus can output a constant voltage 48V under control of the voltage control loop 20. When the output current is greater than or equal to 52.1 A, the voltage control loop 20 no longer takes effect, and the current control loop 30 takes over to control the apparatus.

Similarly, when the output mode is the constant-current output mode, the power supply apparatus operates in the constant-current output mode. In this case, the output current reference value output by the reference value setting module 70 is a set value of the current output by the main power module 10, and the output voltage reference value output by the reference value setting module 70 is the threshold voltage for over-voltage protection of the power supply apparatus. When the voltage control loop 20 determines that the output voltage is greater than or equal to the threshold voltage for over-voltage protection according to the received signal reflecting the output voltage, the output voltage of the main power module 10 is limited.

For example, when the output mode is the constant-current output mode, the output current reference value is set to 52.1 A, and the output voltage reference value may be determined according to the maximum output power. For example, the output voltage reference value is 48V, which indicates that the power supply apparatus can output a constant current 52.1 A under control of the current control loop 30. When the output voltage is equal to or higher than 48V, the current control loop 30 no longer takes effect, and the voltage control loop 20 takes over to control the apparatus.

In order to determine which one of the voltage control loop 20 and the current control loop 30 will take effect according to the output current and the output voltage of the load, the loop selection module 40 is provided between the voltage control loop 20, the current control loop 30 and the drive module 50. The loop selection module transmits the first electric signal output by the current control loop 30 or the second electric signal output by the voltage control loop 20 to the drive module 50, so as to control the drive module 50 to output different drive signals to adjust the output voltage or output current of the main power module 10.

In the above embodiment, by providing the mode selection module 60 in the power supply apparatus, the user is able to set the power supply apparatus to operate in the constant-voltage output mode or the constant-current output mode. By connecting the output terminal of the mode selection module 60 to the reference value setting module 70, the reference value setting module 70 can output the output current reference value and the output voltage reference value. The loop selection module 40 determines to transmit the first electric signal output by the current control loop 30 or the second electric signal output by the voltage control loop 20 to the drive module 50 according to the output mode selected by the user, the output voltage and the output current of the main power module 10, the output voltage reference value and the output current reference value. Thus, the drive module 50 is controlled by the current control loop 30 or the voltage control loop 20 to output a signal, so as to control the main power module 10 to output the constant voltage or the constant current according to the type of the load. Meanwhile, when one of the voltage control loop and the current control loop takes effect, since another loop is also connected to the drive module, over-power protection can also be provided, thereby ensuring safety of the switching power supply.

In an embodiment, the loop selection module 40, the current control loop 30, and the voltage control loop 20 are all implemented by digital control, for example, may be implemented by a DSP (digital signal processing) chip.

Figure 2:
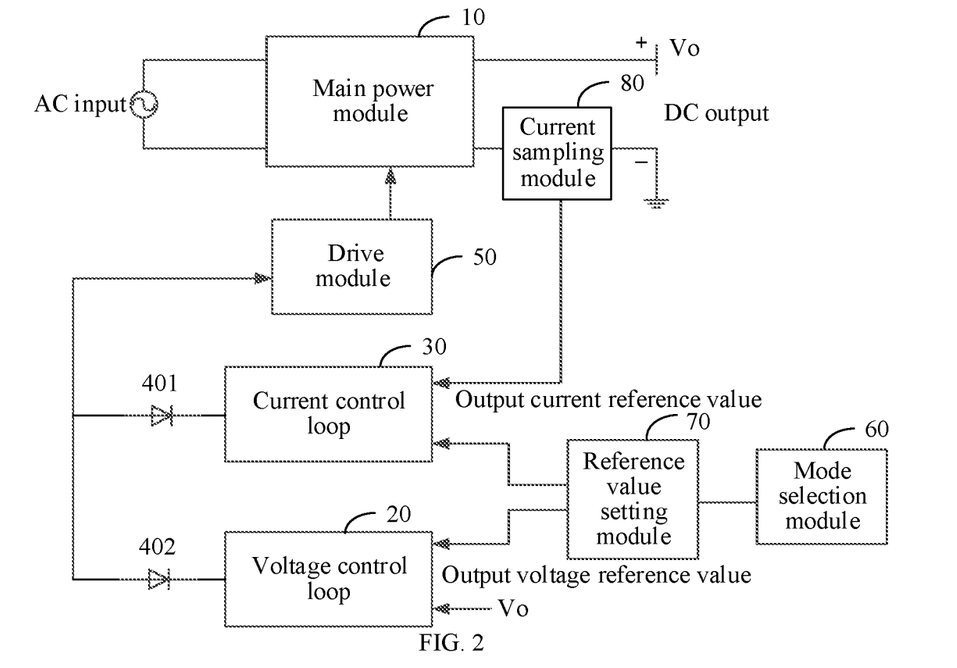
FIG. 2 is a schematic structural diagram of another power supply apparatus provided by an embodiment of the present disclosure.

FIG. 2 is a schematic structural diagram of another power supply apparatus provided by an embodiment of the present disclosure. As shown in FIG. 2, the loop selection module 40 includes a first diode 401 and a second diode 402, a cathode of the first diode 401 is connected to an output terminal of the current control loop 30, a cathode of the second diode 402 is connected to an output terminal of the voltage control loop 20, and both an anode of the first diode 401 and an anode of the second diode 402 are connected to the input terminal of the drive module 50.

The second electric signal output by the voltage control loop 20 or the first electric signal output by the current control loop 30 can be selectively transmitted to the drive module 50 through on and off of the diodes.

Different electric signals are transmitted to the drive module 50 through the on or off of the diodes, which is beneficial for low power consumption and high stability.

In an embodiment, under a condition that the output mode selected by the user is the constant-voltage output mode, when the output current is greater than or equal to the threshold current for over-current protection, the loop selection module 40 transmits the first electric signal to the input terminal of the drive module 50. And when the output current is less than the threshold current for over-current protection, the loop selection module 40 transmits the second electric signal to the input terminal of the drive module 50. Under a condition that the output mode selected by the user is the constant-current output mode, when the output voltage is greater than or equal to the threshold voltage for over-voltage protection, the loop selection module 40 transmits the second electric signal to the input terminal of the drive module 50. And when the output voltage is less than the threshold voltage for over-voltage protection, the loop selection module 40 transmits the first electric signal to the input terminal of the drive module 50.

Specifically, the loop selection module 40 determines the electric signal to be transmitted to the drive module 50 according to the output mode selected by the user, the output voltage and the output current, and the threshold current for over-current protection and threshold voltage for over-voltage protection. When the output mode is the constant-voltage output mode, which means that the power supply apparatus is used as a voltage source, it is necessary to determine a relationship between the output current and the threshold current for over-current protection. When the output current is less than the threshold current for over-current protection, the second electric signal is transmitted to the drive module 50, and thus the voltage control loop 20 takes effect and the current control loop 30 does not take effect. When the output current is greater than or equal to the threshold current for over-current protection, the first electric signal is transmitted to the drive module, and thus the current control loop 30 takes effect and the voltage control loop 20 does not take effect.

Similarly, when the output mode is the constant-current output mode, which means that the power supply apparatus is used as a current source, it is necessary to determine a relationship between the output voltage and the threshold voltage for over-voltage protection. When the output voltage is less than the threshold voltage for over-voltage protection, the first electric signal is transmitted to the drive module 50, and thus the current control loop 30 takes effect and the voltage control loop 20 does not take effect. When the output voltage is greater than the threshold voltage for over-voltage protection, the second electric signal is transmitted to the drive module 50, and thus the voltage control loop 20 takes effect and the current control loop 30 does not take effect.

Whether the data to be compared is the output voltage or the output current is determined according to the output mode. And whether the voltage control loop takes effect or the current control loop takes effect is determined according to a magnitude relationship between the output voltage/the output current and the threshold voltage for over-voltage protection/the threshold current for over-current protection. Therefore, over-current protection can be provided in the constant-voltage output mode, and over-voltage protection can be provided in the constant-current output mode.

Figure 3:
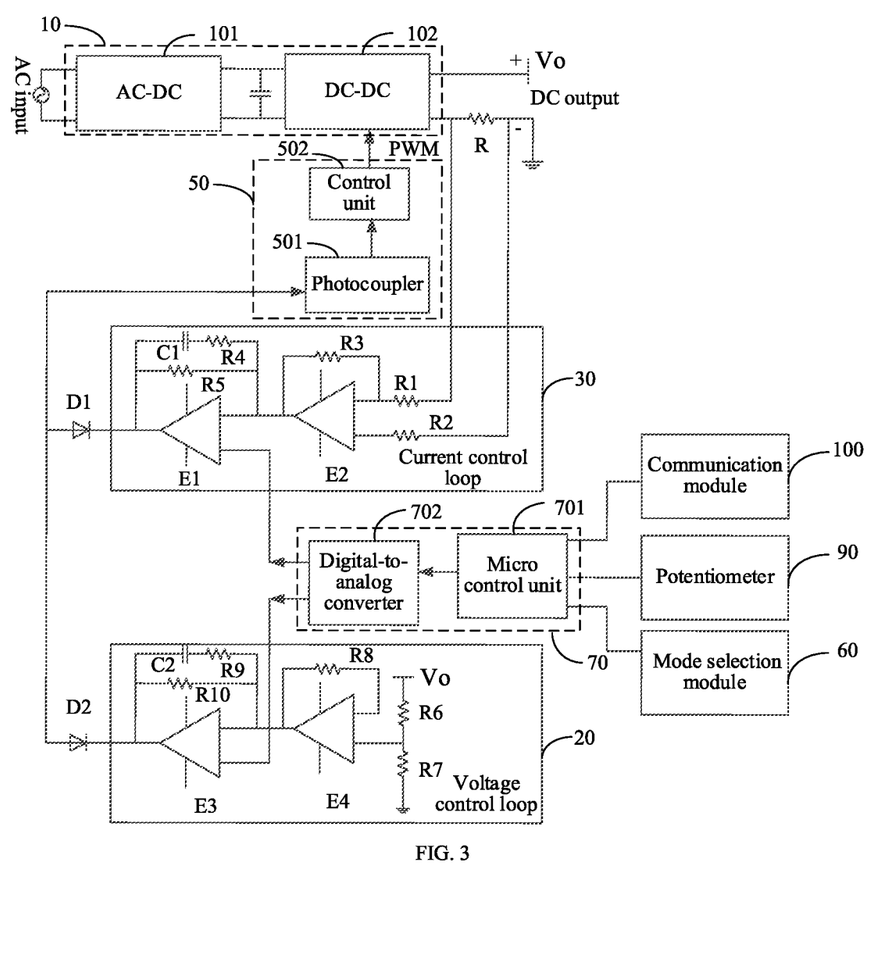
FIG. 3 is a schematic structural diagram of still another power supply apparatus provided by an embodiment of the present disclosure.

FIG. 3 is a schematic structural diagram of still another power supply apparatus provided by an embodiment of the present disclosure. As shown in FIG. 3, the current sampling module 80 is a resistor R.

The current control loop 30 includes resistors R1, R2, R3, R4 and R5, a capacitor C1 and operational amplifiers E1 and E2.

The voltage control loop 20 includes resistors R6, R7, R8, R9 and R10, a capacitor C2 and operational amplifiers E3 and E4.

In an embodiment, the reference value setting module 70 includes a micro control unit 701 and a digital-to-analog converter 702. A first input terminal of the micro control unit 701 is connected to an output terminal of the mode selection module 60, and an output terminal of the micro control unit 701 is connected to an input terminal of the digital-to-analog converter 702. The micro-control unit 701 is configured to determine the output voltage reference value and the output current reference value according to the output mode selected by the user. A first output terminal of the digital-to-analog converter 702 is configured to output the output current reference value, and a second output terminal of the digital-to-analog converter 702 is configured to output the output voltage reference value.

The micro control unit 701 may determine the output voltage reference value or the output current reference value of the power supply apparatus according to the output mode selected by the user. When the output mode selected by the user is the constant-voltage output mode, the micro control unit 701 may determine a corresponding initial output voltage reference value, such as 48V, and determines an output current reference value, such as 52.1 A, according to a maximum output power of the power supply apparatus which is set internally. The output voltage reference value and the output current reference value output by the micro control unit 701 are digital signals, and the digital signals need to be converted into analog signals through the digital-to-analog converter 702, so as to determine an output signal of the voltage control loop 20 or the current control loop 30.

In an embodiment, the drive module 50 includes a photocoupler 501 and a control unit 502.

An input terminal of the photocoupler 501 is connected to the output terminal of the loop selection module 40, and an input terminal of the control unit 502 is connected to an output terminal of the photocoupler 501. An output terminal of the control unit 502 is connected to the main power module 10 and outputs a drive control signal to control the main power module 10 to output the constant current in the constant-current output mode, and provide voltage-limiting protection when the output voltage is greater than or equal to the threshold voltage for over-voltage protection; and control the main power module 10 to output the constant voltage in the constant-voltage output mode, and provide current-limiting protection when the output current is greater than or equal to the threshold current for over-current protection.

The photocoupler 501 is configured to transmit a signal from a first diode D1 or a second diode D2 to the control unit 502, so that the control unit 502 outputs a PWM (pulse width modulation) signal. Through adjusting the PWM signal, the main power module 10 can be controlled to adjust the output voltage or the output current. Illustratively, when the power supply apparatus operates in the constant-voltage output mode, if the output current is greater than or equal to the threshold current for over-current protection, the PWM signal is adjusted, and then the main power module 10 is controlled, so that the output current of the main power module 10 is reduced.

In addition, when the main power module 10 includes an AC-DC (alternating current-direct current) module 101 and a DC-DC module 102, since the AC-DC module 101 has certain safety risks for the human body, the photocoupler 501 is further used to implement isolation between strong and weak electricity.

In an embodiment, the power supply apparatus further includes a potentiometer 90 configured to provide for the user to input a set value; and a second input terminal of the reference value setting module 70 is connected to the potentiometer 90. The reference value setting module 70 is configured to adjust the output current reference value according to the set value when the user selects the constant-current output mode, and determine the output voltage reference value according to a pre-set output power. The reference value setting module 70 is further configured to adjust the output voltage reference value according to the set value when the user selects the constant-voltage output mode, and determine the output current reference value according to the pre-set output power.

In addition, in order to realize the power supply apparatus being applicable to various loads, the output current reference value and the output voltage reference value may also be adjusted by providing the potentiometer 90. As shown in FIG. 3, the potentiometer 90 is connected to the second input terminal of the reference value setting module 70, specifically, connected to a second input terminal of the micro control unit 701. The potentiometer 90 is a variable resistor, and the user can regulate a resistance value of the variable resistor. An adjustable range of the resistance value of the variable resistor is stored in the micro control unit 701, and the adjustable range of the resistance value corresponds to an adjustable range of a voltage.

Specifically, when the user selects the constant-current output mode, the power supply apparatus may output a constant current value, and the current value follows the output current reference value. When the variable resistor is adjusted, the output current reference value may change within the adjustable range while the output voltage reference value remains unchanged. For example, if an initial output current reference value of the power supply apparatus is 52.1 A, an actual adjustable range of 26 A to 52.1 A is implemented by using the potentiometer 90, and the output voltage reference value is 48V.

Likewise, when the user selects the constant-voltage output mode, the power supply apparatus may output a constant voltage value, and the voltage value follows the output voltage reference value. When a VR (variable resistor) potentiometer is adjusted, the output voltage reference value may change within the adjustable range while the output current reference value remains unchanged. For example, if an initial output voltage reference value of the power supply apparatus is 48V, an actual adjustable range of 48V to 56V is implemented by using the potentiometer 90, and the output current reference value is 52.1 A.

The regulation of the output voltage reference value or the output current reference value of the power supply apparatus is implemented by providing the potentiometer 90, thereby enabling the power supply apparatus to meet requirements of various loads.

In an embodiment, the power supply apparatus further includes a communication module 100.

A third input terminal of the reference value setting module 70 receives data from the communication module 100, and the reference value setting module 70 adjusts the output current reference value and the output voltage reference value according to the received data.

The communication module 100 may be a PMbus communication interface. The PMbus is an open standard digital power management protocol. The PMbus communication interface is connected to a host computer, thereby realizing communication between the host computer and the power supply apparatus. Regulation of the output current reference value and the output voltage reference value is implemented through outputting a digital signal by the host computer. A specific adjustment process is similar to the foregoing adjustment process of the output current reference value and the output voltage reference value by using the potentiometer, which is not repeated herein.

In addition, when the power supply apparatus operates in the constant-voltage output mode, the output current reference value, that is, the threshold current for over-current protection, may also be adjusted according to an actual use condition through the PMbus communication interface, so as to limit an output power of the power supply. When the power supply apparatus operates in the constant-current output mode, the output voltage reference value, that is, the threshold voltage for over-voltage protection, may also be adjusted according to the actual use condition through the PMbus communication interface, so as to adapt to loads of different voltages.

In an embodiment, the main power module 10 includes an AC-DC converting unit 101 and a DC-DC converting unit 102, and the AC-DC converting unit 101 and the DC-DC converting unit 102 are connected in cascade.

Figure 4:
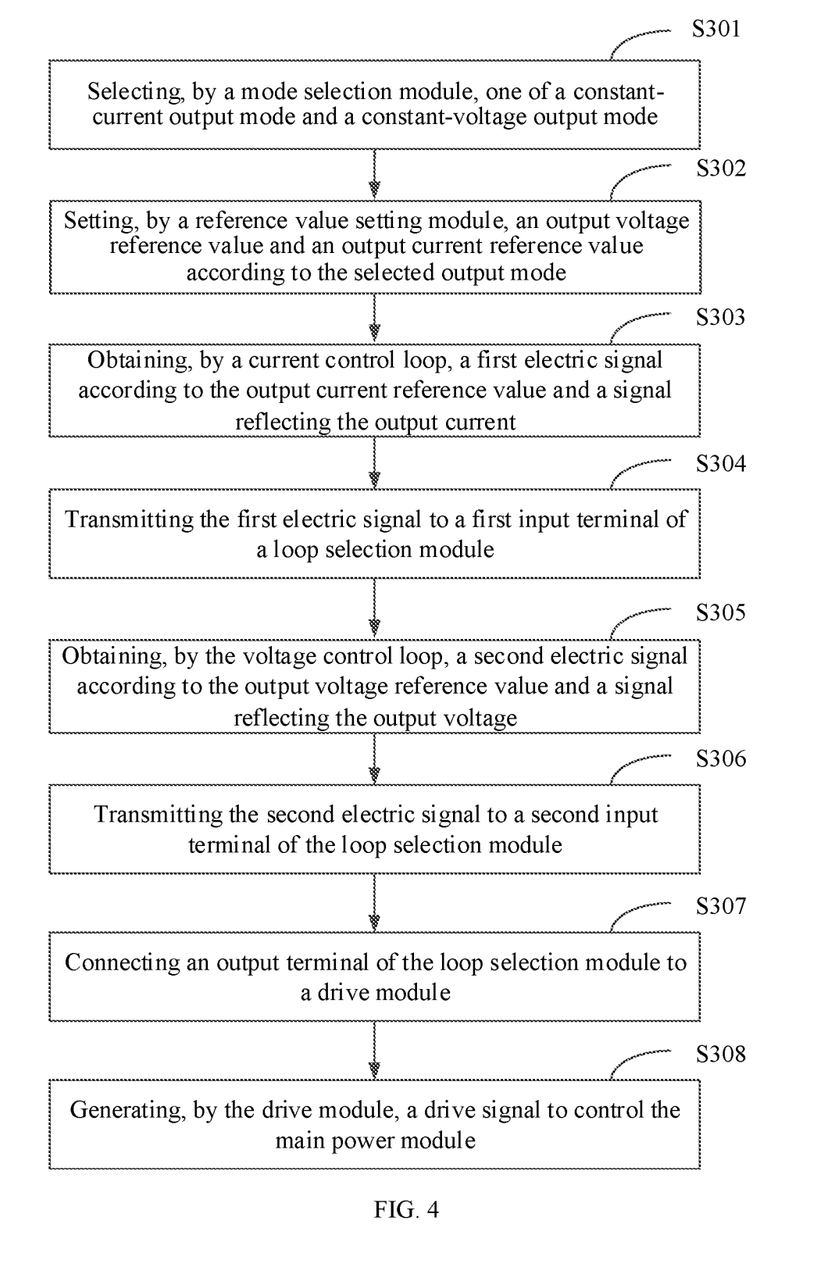
FIG. 4 is a schematic flowchart of a method for controlling a power supply apparatus provided by an embodiment of the present disclosure.

FIG. 4 is a schematic flowchart of a method for controlling a power supply apparatus provided by an embodiment of the present disclosure. The power supply apparatus includes a main power module 10, the main power module 10 is configured to provide an output voltage and an output current, and the method includes:

step S301: selecting, by a mode selection module 60, one of a constant-current output mode and a constant-voltage output mode;

step S302: setting, by a reference value setting module 70, an output voltage reference value and an output current reference value according to the selected output mode; where when the selected output mode is the constant-current output mode, the output voltage reference value is a threshold voltage for over-voltage protection of the power supply apparatus; and when the selected output mode is the constant-voltage output mode, the output current reference value is a threshold current for over-current protection of the power supply apparatus;

step S303: obtaining, by a current control loop 30, a first electric signal according to the output current reference value and a signal reflecting the output current;

step S304: transmitting the first electric signal to a first input terminal of a loop selection module 40;

step S305: obtaining, by the voltage control loop 20, a second electric signal according to the output voltage reference value and a signal reflecting the output voltage;

step S306: transmitting the second electric signal to a second input terminal of the loop selection module 40;

step S307: connecting an output terminal of the loop selection module 40 to a drive module, where the loop selection module is configured to select to transmit the first electric signal to the drive module or transmit the second electric signal to the drive module 50; and step S308: generating, by the drive module 50, a drive signal to control the main power module.

In an embodiment, the loop selection module 40, the current control loop 30 and the voltage control loop 20 can be implemented by analogy circuit or digital control.

In an embodiment, the current control loop 30 and the voltage control loop 20 can be implemented by analogy circuit. The loop selection module 40 includes a first diode 401 and a second diode 402, a cathode of the first diode 401 is connected to an output terminal of the current control loop 30, a cathode of the second diode 402 is connected to an output terminal of the voltage control loop 20, and both an anode of the first diode 402 and an anode of the second diode 402 are connected to an input terminal of the drive module 50. When digital control is used, one output is selected based on output values of current control loop and voltage control loop.

In an embodiment, under a condition that the selected output mode is the constant-voltage output mode, when the output current is greater than or equal to the threshold current for over-current protection of the power supply apparatus, the loop selection module 40 transmits the first electric signal to the drive module 50; and when the output current is less than the threshold current for over-current protection of the power supply apparatus, the loop selection module 40 transmits the second electric signal to the drive module 50.

Under a condition that the selected output mode is the constant-current output mode, when the output voltage is greater than or equal to the threshold voltage for over-voltage protection of the power supply apparatus, the loop selection module transmits the second electric signal to the drive module 50; and when the output voltage is less than the threshold voltage for over-voltage protection of the power supply apparatus, the loop selection module 40 transmits the first electric signal to the drive module 50.

In an embodiment, the drive module 50 includes a photocoupler 501 and a control unit 502. An input terminal of the photocoupler 501 is connected to the output terminal of the loop selection module 40. An input terminal of the control unit 502 is connected to an output terminal of the photocoupler 501. An output terminal of the control unit 502 is connected to the main power module 10. The drive module 50 outputs a drive control signal to control the main power module 10 to output the constant current in the constant-current output mode and provide voltage-limiting protection when the output voltage is greater than or equal to the threshold voltage for over-voltage protection. And the drive module 50 controls the main power module 10 to output the constant voltage in the constant-voltage output mode and perform current-limiting protection when the output current is greater than or equal to the threshold current for over-current protection.

In an embodiment, the method further includes the following step. When the selected output mode is the constant-current output mode, the reference value setting module 70 adjusts the output current reference value according to a set value of a potentiometer 90 by a user, and determines the output voltage reference value according to a pre-set output power; or, when the selected output mode is the constant-voltage output mode, the reference value setting module 70 adjusts the output voltage reference value according to the set value of the potentiometer 90 by the user, and determines the output current reference value according to the pre-set output power.

In an embodiment, the method further includes the following step. The reference value setting module 70 adjusts the output current reference value and the output voltage reference value according to data received from a communication module 100.

In an embodiment, the main power module 10 includes an AC-DC converting unit 101 and a DC-DC converting unit 102, and the AC-DC converting unit 101 and the DC-DC converting unit 102 are connected in cascade.

The method for controlling the power supply apparatus is a method corresponding to the power supply apparatus in the foregoing embodiments, and can be used to execute technical solutions in the foregoing power supply apparatus embodiments. Implementation principles and technical effects thereof are similar, which are not repeatedly described herein in this embodiment.

Finally, it should be noted that the foregoing embodiments are merely intended for describing the technical solutions of the present disclosure, but not intended to limit the present disclosure. Although the present disclosure is described in detail with reference to the foregoing embodiments, a person of ordinary skill in the art should understand that they may still make modifications to the technical solutions described in the foregoing embodiments, or make equivalent replacements to some or all technical features thereof. However, these modifications or replacements do not make the essence of the corresponding technical solutions depart from the scope of the technical solutions of the embodiments of the present disclosure.

What is claimed is:

1. A power supply apparatus for providing an output voltage and an output current, comprising a main power module, a mode selection module, a reference value setting module, a voltage control loop, a current control loop, a loop selection module and a drive module, wherein
the mode selection module is configured to provide for a user to select an output mode, wherein the output mode comprises a constant-current output mode and a constant-voltage output mode;
a first input terminal of the reference value setting module is connected to the mode selection module, wherein the reference value setting module is configured to output an output voltage reference value and an output current reference value according to the output mode selected by the user; wherein when the output mode selected by the user is the constant-current output mode, the output voltage reference value is a threshold voltage for over-voltage protection of the power supply apparatus;
and when the output mode selected by the user is the constant-voltage output mode, the output current reference value is a threshold current for over-current protection of the power supply apparatus;
the current control loop receives a signal reflecting the output current and the output current reference value, and outputs a first electric signal;
the voltage control loop receives a signal reflecting the output voltage and the output voltage reference value, and outputs a second electric signal;
two input terminals of the loop selection module respectively receive the first electric signal and the second electric signal, an output terminal of the loop selection module is connected to an input terminal of the drive module, and the loop selection module is configured to select to transmit the first electric signal or the second electric signal to the input terminal of the drive module; and
an output terminal of the drive module provides a drive signal for the main power module to control the main power module to output a constant voltage or a constant current.

2. The power supply apparatus according to claim 1, wherein the loop selection module, the current control loop and the voltage control loop are implemented by analogy circuit or digital control.

3. The power supply apparatus according to claim 1, wherein the current control loop and the voltage control loop are implemented by analogy circuit, the loop selection module comprises a first diode and a second diode, a cathode of the first diode is connected to an output terminal of the current control loop, a cathode of the second diode is connected to an output terminal of the voltage control loop, and both an anode of the first diode and an anode of the second diode are connected to the input terminal of the drive module.

4. The power supply apparatus according to claim 1, wherein
under a condition that the output mode selected by the user is the constant-voltage output mode, when the output current is greater than or equal to the threshold current for over-current protection, the loop selection module transmits the first electric signal to the input terminal of the drive module; and when the output current is less than the threshold current for over-current protection, the loop selection module transmits the second electric signal to the input terminal of the drive module; and
under a condition that the output mode selected by the user is the constant-current output mode, when the output voltage is greater than or equal to the threshold voltage for over-voltage protection, the loop selection module transmits the second electric signal to the input terminal of the drive module; and when the output voltage is less than the threshold voltage for over-voltage protection, the loop selection module transmits the first electric signal to the input terminal of the drive module.

5. The power supply apparatus according to claim 1, wherein
the reference value setting module comprises a micro control unit and a digital-to-analog converter;
a first input terminal of the micro control unit is connected to an output terminal of the mode selection module, an output terminal of the micro control unit is connected to an input terminal of the digital-to-analogue converter, and the micro control unit is configured to determine the output voltage reference value and the output current reference value according to the output mode selected by the user; and
a first output terminal of the digital-to-analog converter is configured to output the output current reference value, and a second output terminal of the digital-to-analog converter is configured to output the output voltage reference value.

6. The power supply apparatus according to claim 1, wherein the drive module comprises a photocoupler and a control unit, wherein
an input terminal of the photocoupler is connected to the output terminal of the loop selection module; and
an input terminal of the control unit is connected to an output terminal of the photocoupler, an output terminal of the control unit is connected to the main power module and outputs a drive control signal to control the main power module to output the constant current in the constant-current output mode, and perform voltage-limiting protection when the output voltage is greater than or equal to the threshold voltage for over-voltage protection; and control the main power module to output the constant voltage in the constant-voltage output mode, and perform current-limiting protection when the output current is greater than or equal to the threshold current for over-current protection.

7. The power supply apparatus according to claim 1, wherein the power supply apparatus further comprises a potentiometer, configured to provide for the user to input a set value; and
a second input terminal of the reference value setting module is connected to the potentiometer, wherein the reference value setting module is configured to adjust the output current reference value according to the set value when the user selects the constant-current output mode, and determine the output voltage reference value according to a pre-set output power; and is further configured to adjust the output voltage reference value according to the set value when the user selects the constant-voltage output mode, and determine the output current reference value according to the pre-set output power.

8. The power supply apparatus according to claim 1, wherein the power supply apparatus further comprises a communication module; and
   a third input terminal of the reference value setting module receives data from the communication module, and the reference value setting module adjusts the output current reference value and the output voltage reference value according to the received data.

9. The power supply apparatus according to claim 1, wherein the main power module comprises an AC-DC (alternating current-direct current) converting unit and a DC-DC (direct current-direct current) converting unit, and the AC-DC converting unit and the DC-DC converting unit are connected in cascade.

10. A method for controlling a power supply apparatus, wherein the power supply apparatus comprises a main power module for providing an output voltage and an output current, and the method comprises:
   selecting, by a mode selection module, one of a constant-current output mode and a constant-voltage output mode;
   setting, by a reference value setting module, an output voltage reference value and an output current reference value according to the selected output mode; wherein when the selected output mode is the constant-current output mode, the output voltage reference value is a threshold voltage for over-voltage protection of the power supply apparatus; and when the selected output mode is the constant-voltage output mode, the output current reference value is a threshold current for over-current protection of the power supply apparatus;
   obtaining, by a current control loop, a first electric signal according to the output current reference value and a signal reflecting the output current;
   transmitting the first electric signal to a first input terminal of a loop selection module;
   obtaining, by the voltage control loop, a second electric signal according to the output voltage reference value and a signal reflecting the output voltage;
   transmitting the second electric signal to a second input terminal of the loop selection module;
   connecting an output terminal of the loop selection module to a drive module, wherein the loop selection module is configured to select to transmit the first electric signal to the drive module or transmit the second electric signal to the drive module; and
   generating, by the drive module, a drive signal to control the main power module.

11. The method according to claim 10, wherein the loop selection module, the current control loop and the voltage control loop are implemented by analogy circuit or digital control.

12. The method according to claim 10, wherein the current control loop and the voltage control loop are implemented by analogy circuit, the loop selection module comprises a first diode and a second diode, a cathode of the first diode is connected to an output terminal of the current control loop, a cathode of the second diode is connected to an output terminal of the voltage control loop, and both an anode of the first diode and an anode of the second diode are connected to an input terminal of the drive module.

13. The method according to claim 10, wherein
   under a condition that the selected output mode is the constant-voltage output mode, when the output current is greater than or equal to the threshold current for over-current protection of the power supply apparatus, transmitting, by the loop selection module, the first electric signal to the drive module; and when the output current is less than the threshold current for over-current protection of the power supply apparatus, transmitting, by the loop selection module, the second electric signal to the drive module; and
   under a condition that the selected output mode is the constant-current output mode, when the output voltage is greater than or equal to the threshold voltage for over-voltage protection of the power supply apparatus, transmitting, by the loop selection module, the second electric signal to the drive module; and when the output voltage is less than the threshold voltage for over-voltage protection of the power supply apparatus, transmitting, by the loop selection module, the first electric signal to the drive module.

14. The method according to claim 10, wherein the drive module comprises a photocoupler and a control unit, wherein
   an input terminal of the photocoupler is connected to the output terminal of the loop selection module; and
   an input terminal of the control unit is connected to an output terminal of the photocoupler, an output terminal of the control unit is connected to the main power module and outputs a drive control signal to control the main power module to output a constant current in the constant-current output mode, and provide voltage-limiting protection when the output voltage is greater than or equal to the threshold voltage for over-voltage protection; and control the main power module to output a constant voltage in the constant-voltage output mode, and provide current-limiting protection when the output current is greater than or equal to the threshold current for over-current protection.

15. The method according to claim 10, wherein the method further comprises:
   when the selected output mode is the constant-current output mode, adjusting, by the reference value setting module, the output current reference value according to a set value of a potentiometer by a user, and determining the output voltage reference value according to a pre-set output power; or, when the selected output mode is the constant-voltage output mode, adjusting, by the reference value setting module, the output voltage reference value according to the set value of the potentiometer by the user, and determining the output current reference value according to the pre-set output power.

16. The method according to claim 10, wherein the method further comprises:
   adjusting, by the reference value setting module, the output current reference value and the output voltage reference value according to data received from a communication module.

17. The method according to claim 10, wherein the main power module comprises an AC-DC converting unit and a DC-DC converting unit, and the AC-DC converting unit and the DC-DC converting unit are connected in cascade.

* * * * *